US012079477B2

(12) United States Patent
Li et al.

(10) Patent No.: US 12,079,477 B2
(45) Date of Patent: Sep. 3, 2024

(54) OPTIMIZING BACKEND WORKLOAD PROCESSING IN A STORAGE SYSTEM

(71) Applicant: Dell Products, L.P., Hopkinton, MA (US)

(72) Inventors: Ningdong Li, Acton, MA (US); Peng Yin, Southborough, MA (US); James McGillis, Franklin, MA (US); Gabriel Hershkovitz, Newton, MA (US); Thomas Rogers, Littleton, MA (US); Robert Lucey, Whitechurch (IE)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/869,017

(22) Filed: Jul. 20, 2022

(65) Prior Publication Data

US 2024/0028202 A1 Jan. 25, 2024

(51) Int. Cl.
*G06F 3/06* (2006.01)
(52) U.S. Cl.
CPC ............ *G06F 3/061* (2013.01); *G06F 3/0655* (2013.01); *G06F 3/0679* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41;
(Continued)

(56) References Cited

U.S. PATENT DOCUMENTS 5,893,140 A * 4/1999 Vahalia ............... G06F 12/0813
711/E12.04
6,820,035 B1 * 11/2004 Zahavi ............... G06F 11/3447
714/E11.193
(Continued)

OTHER PUBLICATIONS

S. Alsubaihi and J.-L. Gaudiot, "A Runtime Workload Distribution with Resource Allocation for CPU-GPU Heterogeneous Systems," 2017 IEEE International Parallel and Distributed Processing Symposium Workshops (IPDPSW), Lake Buena Vista, FL, USA, 2017, pp. 994-1003, doi: 10.1109/IPDPSW.2017.19. (Year: 2017).*

(Continued)

*Primary Examiner* — Daniel C. Chappell
(74) *Attorney, Agent, or Firm* — Anderson Gorecki LLP

(57) ABSTRACT

Backend processes in a storage system are implemented using a plurality of worker threads that are divided into two thread groups: thread group A and thread group B. Threads of thread group A are able to be used to process both Random Read Miss (RRM) workload items and Random Write Miss (RWM) workload items. Threads of thread group B are divided into two thread sub-groups: thread sub-group B1 and thread sub-group B2. Threads of thread sub-group B1 are able to be used to process both RRM and RWM workload items, while threads of thread sub-group B2 are reserved to be used to process only RRM workload items. The size of thread sub-group B2 relative to the size of thread sub-group B1 changes over time (from 0 threads to all threads of thread group B), depending on the duty cycle of the threads of group A.

18 Claims, 10 Drawing Sheets

(58) Field of Classification Search
CPC ......... G06F 17/00–40; G06F 21/00–88; G06F 2003/0697; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 9,183,167 | B2 * | 11/2015 | Liu | G06F 3/061 |
| 9,336,168 | B2 * | 5/2016 | Liu | G06F 13/24 |
| 10,817,220 | B2 * | 10/2020 | Bono | G06F 9/485 |
| 11,301,154 | B2 * | 4/2022 | Zhang | G06F 3/0641 |
| 2005/0005063 | A1 * | 1/2005 | Liu | G06F 3/0689 711/112 |
| 2005/0120188 | A1 * | 6/2005 | Kuwabara | G06F 3/0605 711/159 |
| 2011/0087814 | A1 * | 4/2011 | Liu | G06F 9/4812 710/260 |
| 2012/0331475 | A1 * | 12/2012 | Ostrovsky | G06F 3/0608 718/104 |
| 2018/0026904 | A1 * | 1/2018 | Van De Groenendaal | G06F 3/0653 |
| 2018/0046512 | A1 * | 2/2018 | Kang | G06F 9/5027 |
| 2018/0210744 | A1 * | 7/2018 | Shih | G06F 12/10 |
| 2020/0004460 | A1 * | 1/2020 | Gould | G06F 3/0613 |

OTHER PUBLICATIONS

C. Hankendi and A. K. Coskun, "Adaptive Power and Resource Management Techniques for Multi-threaded Workloads," 2013 IEEE International Symposium on Parallel & Distributed Processing, Workshops and Phd Forum, Cambridge, MA, USA, 2013, pp. 2302-2305, doi: 10.1109/IPDPSW.2013.258. (Year: 2013).*

C. Albrecht et al., "Impact of coprocessors on a multithreaded processor design using prioritized threads," 14th Euromicro International Conference on Parallel, Distributed, and Network-Based Processing (PDP'06), Montbeliard-Sochaux, France, 2006, doi: 10.1109/PDP.2006.42. (Year: 2006).*

E. Makridis, K. Deliparaschos, E. Kalyvianaki, A. Zolotas and T. Charalambous, "Robust Dynamic CPU Resource Provisioning in Virtualized Servers," in IEEE Transactions on Services Computing, vol. 15, No. 2, pp. 956-969, Mar. 1-Apr. 2022, doi: 10.1109/TSC. 2020.2966972. (Year: 2022).*

* cited by examiner

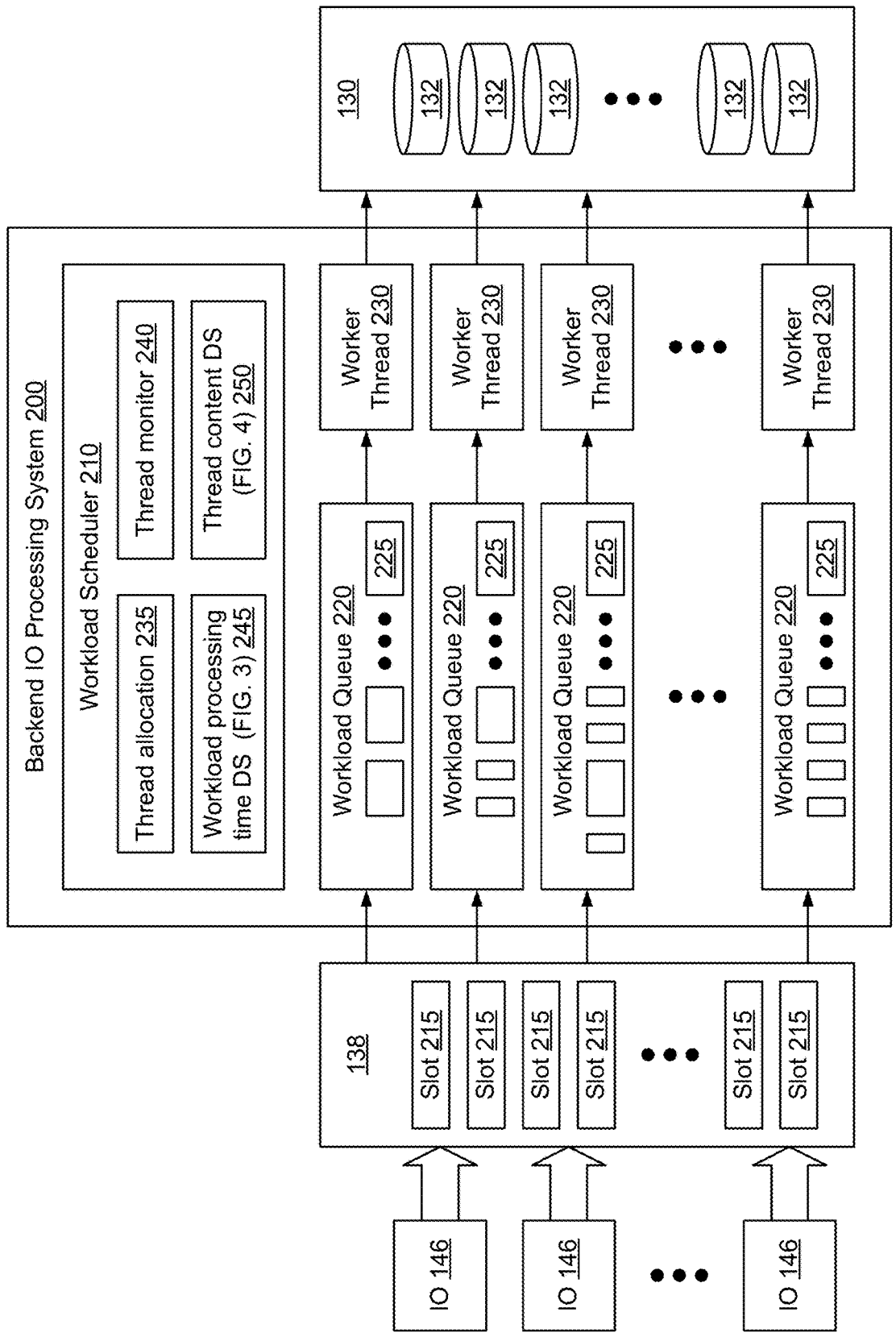

FIG. 3

| Workload processing time data structure 245 | | | |
|---|---|---|---|
| IO 300 | Workload Type 305 | Start of processing Time 310 | End of processing Time 315 |
| 1121 | RRM | 12.2 | 13.3 |
| 1122 | RWM | 12.4 | 17.8 |
| ⋮ | ⋮ | ⋮ | ⋮ |
| 1255 | RRM | 83.5 | 84.4 |

| RRM Current average processing time 320 | 1.1 time unit | RWM Current average processing time 325 | 5.4 time units |
|---|---|---|---|

FIG. 4

| Thread content DS 250 | | | |
|---|---|---|---|
| Worker Thread 400 | # RRM work items in queue 405 | # RWM work items in queue 410 | WQ queueing time 415 |
| 1 | 15 | 22 | 135.3 time units |
| 2 | 22 | 8 | 67.4 time units |
| 3 | 20 | 12 | 86.8 time units |
| 4 | 35 | 0 | 38.5 time units |
| ⋮ | ⋮ | ⋮ | ⋮ |
| N | 18 | 4 | 41.1 time units |

OPTIMIZING BACKEND WORKLOAD PROCESSING IN A STORAGE SYSTEM

FIELD

This disclosure relates to computing systems and related devices and methods, and, more particularly, to a method and apparatus for optimizing backend workload processing in a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, backend processes in a storage system are configured to implement random read miss (RRM) workload items and random write miss (RWM) workload items on a storage system. RRM workload items occur when a host requests a piece of data that is not currently stored in shared global memory, and must be read from backend storage resources into shared global memory, before being read out to the host. RWM workload items occur when a host writes a piece of data to the storage system, which is temporarily stored in shared global memory and then written out (destaged) to backend storage resources. RRM workload items require less time to process, but are time sensitive workload items, since when a RRM workload item is submitted to the storage system, the host is waiting for a response from the storage system. RWM workload items often take more time to process than RRM workload items, but are also often more tolerant to processing delays than RRM workload items.

According to some embodiments, the backend processes in a storage system are implemented using a plurality of worker threads that execute on physical resources, such as CPUs. The worker threads are divided into two thread groups, referred to herein as thread group A and thread group B. Threads of thread group A are able to be used to process both RRM and RWM workload items. Threads of thread group B are divided into two thread sub-groups: thread sub-group B1 and thread sub-group B2. Threads of thread sub-group B1 are able to be used to process both RRM and RWM workload items, while threads of thread sub-group B2 are reserved to be used to process only RRM workload items. The size of thread sub-group B2 relative to the size of thread sub-group B1 changes over time, based on the duty cycle of the threads of group A. When the duty cycle of the threads of thread group A is low, thread sub-group B1 contains zero threads, and all threads of thread group B are reserved to process RRM workload items, thus minimizing latency for processing of RRM workload items. As the duty cycle of the threads of thread group A increases, the number of threads allocated to thread sub-group B1 increases to enable RWM workload items to be spread across a larger number of threads, to help increase processing of RWM workload items. When the duty cycle of the threads of thread group A reaches a high value, the number of threads allocated to thread sub-group B1 increases to include all threads of thread group B, such that thread sub-group B2 has zero threads, to achieve the maximum allowed IO operations per second (IOPs) for the storage system.

In some embodiments, RRM and RWM workload items are placed in respective workload queues for each worker thread, and the processing time of each workload item that is implemented by the backend is monitored and used to update an ongoing calculation of the current average processing time of each workload type. By determining the current average processing time of each workload type, and monitoring the number of workload items of each workload type in each workload queue, it is possible to calculate a workload queue queueing time for each workload queue. Using these workload queue queueing times, RRM workload items are assigned to the worker thread with the minimum workload queue queueing time of all threads of thread group A and thread group B. RWM workload items are assigned to the worker thread with the minimum workload queue queueing time of all threads of thread group A and thread sub-group B1.

BRIEF DESCRIPTION OF THE DRAWINGS

FIG. 2 is a functional block diagram of an example backend IO processing system configured to implement RRM and RWM workload items on backend storage resources of a storage system, according to some embodiments.

FIG. 3 is a functional block diagram of an example workload processing time data structure maintained by an example workload scheduler of the backend IO processing system of FIG. 2, according to some embodiments.

FIG. 4 is a functional block diagram of an example worker thread content data structure maintained by an example workload scheduler of the backend IO processing system of FIG. 2, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
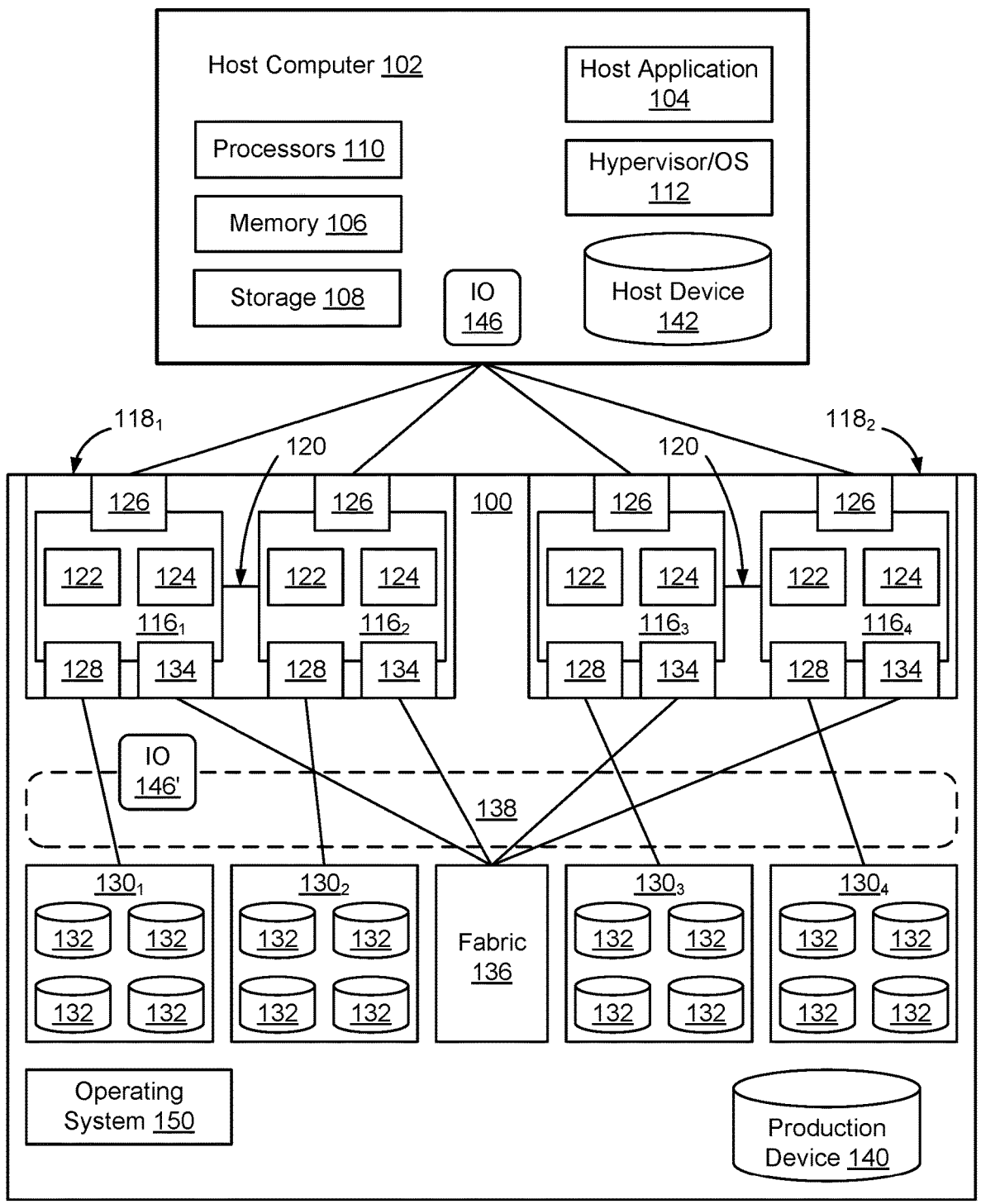
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

FIG. 2 is a functional block diagram of an example backend IO processing system 200 configured to implement random read miss (RRM) workload items and random write miss (RWM) workload items on a storage system, according to some embodiments. RRM workload items occur when a host requests (reads) a piece of data from the storage system (IO 146) that is not currently stored in shared global memory 138, and must be read from backend storage resources 132 into shared global memory 138, before being sent to the host 102. RWM workload items occur when a host writes a piece of data to the storage system (IO 146), which is temporarily stored in shared global memory and then written out (destaged) to backend storage resources 132. RRM workload items require less time to process, but are time sensitive workload items and hence more sensitive to latency, because when a RRM workload item is submitted to the storage system, the host is waiting for a response from the storage system. RWM workload items often take more time to process than RRM workload items, but also often are more tolerant to processing delays than RRM workload items.

According to some embodiments, the backend IO processing system 200 in a storage system 100 is implemented using a plurality of worker threads 230 that execute on physical resources, such as processors 122. In some embodiments, the worker threads 230 are divided into two thread groups, referred to herein as thread group A and thread group B. Threads of thread group A are able to be used to process both RRM and RWM workload items. Threads of thread group B are divided into two thread sub-groups: thread sub-group B1 and thread sub-group B2. Threads of thread sub-group B1 are able to be used to process both RRM and RWM workload items, while threads of thread sub-group B2 are reserved to be used only to process only RRM workload items. The size of thread sub-group B2 relative to the size of thread group B1 changes over time, based on the duty cycle of the threads of thread group A. When the duty cycle of the threads of thread group A is low, thread sub-group B1 contains zero threads, and all threads of thread group B are reserved to process RRM workload items, thus minimizing latency for processing of RRM workload items. As the duty cycle of the threads of thread group A increases, the number of threads allocated to thread sub-group B1 increases to enable RWM workload items to be spread across a larger number of threads. Spreading RWM workload items across a larger number of threads helps increase processing of the RWM workload items, thus accelerating the destaging operations to free up slots 215 of shared global memory 138. When the duty cycle of the threads of thread group A reaches a high value, the number of threads allocated to thread sub-group B1 increases to include all threads of thread group B, to achieve the maximum allowed IO operations per second (IOPs) for the storage system 100.

In some embodiments, RRM and RWM workload items 225 are placed in respective workload queues 220 for each worker thread 230, and the processing time of each workload item that is implemented by the backend is monitored and used to update an ongoing calculation of the current average processing time of each workload type. By determining the current average processing time of each workload type, and monitoring the number of workload items 225 of each workload type in each workload queue 220, it is possible to calculate a workload queue queueing time for each workload queue 220. Using these workload queue queueing times, RRM workload items are assigned to the worker thread with the minimum workload queue queueing time of all threads of thread group A and thread group B. RWM workload items are assigned to the worker thread with the minimum workload queue queueing time of all threads of thread group A and thread sub-group B1.

The duty cycle of the threads of thread group A are monitored by the workload scheduler 210. In some embodiments, the duty cycle is measured and based on the idle time of the threads of the thread group during a monitoring interval. In some embodiments, the duty cycle is updated every monitoring interval. An example monitoring interval might be two seconds, depending on the implementation, although other monitoring interval lengths might be used as well. A longer monitoring interval will reduce the frequency that the number of threads is switched between thread groups, whereas a shorter monitoring interval will increase the frequency that threads are switched between thread groups. It should be noted that, in some embodiments, the allocation of threads between the thread sub-group B1 and thread sub-group B2 only changes how the workload scheduler M allocates new workload items 225 to workload queues 220, and doesn't affect how the worker threads are implementing the allocated workloads on the underlying processors. Accordingly, since changing the number of threads in the thread sub-groups only affects workload scheduling, and doesn't affect the threads themselves, it is possible to frequently change thread assignments between thread sub-group B1 and thread sub-group B2 without affecting execution of the threads on the underlying hardware of storage system 100.

As shown in FIG. 2, in some embodiments the backend IO processing system 200 has a plurality of worker threads 230, each of which has an associated workload queue 220. IO operations 146 are received by the storage system and are allocated slots 215 in shared global memory 138. As discussed in greater detail herein, in some embodiments the backend processing system has a set of worker threads (thread group A and thread group B) that are dedicated to processing RRM IO operations and RWM IO operations. The focus of this disclosure is on a particular way of allocating these dedicated threads (worker threads 230) between RRM IO workload items and RWM IO workload items. In some embodiments, the backend processing system 200 has other threads, in addition to the threads of thread group A and thread group B, that the backend processing system 200 uses for other functions. Use of other threads by the backend processing system 200 to implement functions other than processing RRM IO workload items and RWM IO workload items is beyond the scope of this disclosure.

In some embodiments, the backend IO processing system 200 has a workload scheduler 210 that assigns RRM IO operations and RWM IO operations to workload queues 220 according to workload type and according to thread groupings. As shown in FIG. 2, in some embodiments the workload scheduler 210 has a thread allocation subsystem 235 configured to divide the worker threads 230 into two thread groups, referred to herein as thread group A and thread group B, and configured to dynamically subdivide the worker threads 230 of one of the thread groups (thread group B) into two thread sub-groups (thread sub-group B1 and thread sub-group B2). The workload scheduler 200 has a thread monitor 240 that maintains a workload processing time data structure 245 that is used to determine a current average amount of time the backend IO processing system 200 requires to complete processing of each workload type. An example workload processing time data structure 245 is shown in FIG. 3. The thread allocation subsystem 235 also maintains a thread content data structure 250 that is used to calculate a workload queue queueing times for each worker thread. An example thread content data structure 250 is shown in FIG. 4. Although separate data structures are shown in FIGS. 3 and 4, it should be understood that a single data structure or that multiple data structures could be used, depending on the implementation. Additionally, although the data structures shown in FIGS. 3 and 4 are in the form of tables for ease of illustration, it should be understood that other types of data structures could be used to maintain the information required by the workload scheduler 210 to implement the processes described herein.

According to some embodiments, the thread allocation subsystem 235 works with the thread monitor 240 to determine the duty cycle of the threads of thread group A and, based on the duty cycle of the threads of thread group A, dynamically adjusts the number of threads of thread group B that are included in each of thread sub-group B1 and thread sub-group B2.

FIG. 3 is a functional block diagram of an example workload processing time data structure 245 maintained by an example workload scheduler 210 of the backend processing system 200 of FIG. 2, according to some embodiments. As shown in FIG. 3, in some embodiments, the thread monitor adds an entry for each IO operation to the workload processing time data structure 245. Each entry includes the IO operation ID 300, a workload type (RRM or RWM) 305, a start time 310 when the IO operation was picked by the worker thread for processing from the respective workload queue 220 (start of processing time), and an end time 315 when processing of the IO operation was completed by the worker thread. The data structure 245 may include additional values, such as a processing time value calculated as a difference between the processing end time 315 and the processing start time 310, depending on the implementation. By keeping relevant entries in the workload processing time data structure 245 for a selected monitoring interval, and ejecting entries after expiration of the monitoring interval, it is possible to have the most recent entries (those that have been processed during the monitoring interval) used to calculate the current average processing time values 230, 235. This enables a rolling average to be used to calculate the current average processing time values 230, 235, so that the workload scheduler 210 always has current information about how long each type of workload is taking to process by the worker threads 230.

For example, in some embodiments, the workload processing time data structure 245 includes entries for IO operations that were processed over a monitoring interval, such as during the previous two seconds. In some embodiments, the workload processing time data structure 245 includes entries for IO operations that were completed over a monitoring interval, such as during the previous two seconds, regardless of whether processing of the IO operations was started during the monitoring interval. In either case, IO operations that are outside of the monitoring interval are removed from the workload processing time data structure 245.

In some embodiments, the thread monitor 240 is configured to calculate a current average processing time for RRM workload type IO operations 320 and to calculate a current average processing time for RWM workload type IO operations 325, based on completed entries of the workload type contained in the workload processing time data structure 245. For example, if there are 100 RRM entries that have been completed during the monitoring interval, the processing time (processing end time minus processing start time) for each of the completed RRM entries are summed and then divided by 100 to determine a current average processing time value 320 for RRM workload type IO operations. Similarly, if there are 200 RWM entries that been completed during the monitoring interval, the processing time (processing end time minus processing start time) for each of the completed RWM entries are summed and then divided by 200 to determine a current average processing time value 325 for RWM workload type IO operations.

In some embodiments, the workload scheduler maintains a worker thread content data structure 250 that it uses to determine the queueing time for each worker thread. In some embodiments, the queueing time is calculated as an amount of time it will take each of the worker threads 230 to process workload operations that have been assigned to the respective worker thread and stored in the respective workload queue. FIG. 4 is a functional block diagram of an example worker thread content data structure 250 maintained by an example workload scheduler 210 of the backend IO processing system 200 of FIG. 2, according to some embodiments. As shown in FIG. 4, in some embodiments the worker thread content data structure 250 maintains an entry for each worker thread 230 identifying the worker thread 400, the number of RRM workload type operations 405 in the set workload queues 220 that the worker thread 400 has been assigned to process, and the number of RWM workload type IO operations 410 that the worker thread 400 has been assigned to process.

The thread allocation system 235 therefore is able to determine a queuing time for the worker thread—how long it will take a given worker thread to process the IO operations that have been assigned to the worker thread, by determining an amount of time it will take to process the RRM workload that has been assigned to the worker thread (multiplying the number of RRM workload type IO operations in the workload queue 405 with the current average processing time value for the RRM workload type 320), and adding that to the amount of time it will take to process the RWM workload that has been assigned to the worker thread (multiplying the number of RWM workload type IO operations in the workload queue 415 with the current average processing time value for the RWM workload type 325).

For example, in FIG. 4, worker thread 1 has been assigned 15 RRM work items, and 22 RWM work items. As shown in FIG. 3, the RRM current average processing time is 1.1 time units, and the RWM current average processing time is 5.4 time units. Accordingly, the workload queue queueing time is calculated as WQ=(15×1.1 TU)+(22×5.4 TU)=135.3 TU.

Having current average processing time values for each workload type thus allows the workload scheduler 210 to have an accurate estimate of an amount of time it will take each worker thread to process the workload that is currently assigned to the worker thread. This allows the workload scheduler 210 to more intelligently assign new IO operations to worker threads 230, which are then placed in the respective workload queues 220. For example, in some embodiments new RRM IO operations are always assigned to the worker thread with the least total work queuing time 415 among all threads of both thread group A and thread group B. By having an accurate estimate of how long it will take each of the threads to complete its currently assigned work, the workload scheduler 210 is more accurately able to determine which of the worker threads will be able to work on the new IO operation first, thus enabling the new IO operation to be pushed to the workload queue 220 for the selected worker thread 230 to optimize processing of the new IO operation.

Figure 5:
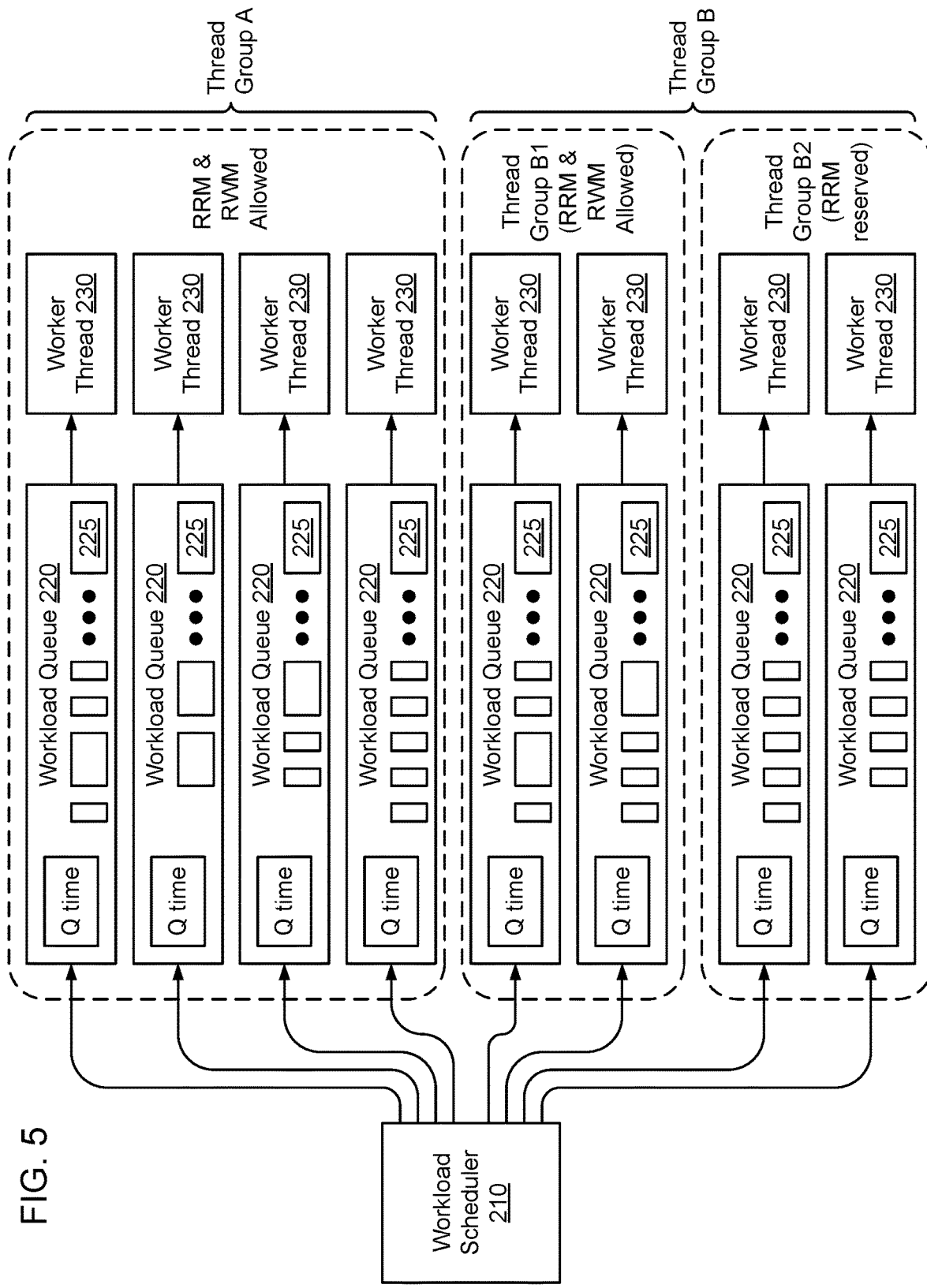
FIG. 5 is a functional block diagram of an example set of worker threads of the backend IO processing system of FIG. 2, showing the worker threads divided into two thread groups (thread group A and thread group B), and showing thread group B further sub-divided into two thread sub-groups (thread sub-group B1 and thread sub-group B2), according to some embodiments.

FIG. 5 is a functional block diagram of an example set of worker threads of the backend IO processing system of FIG. 2, showing the worker threads divided into two thread groups (thread group A and thread group B), and showing thread group B further sub-divided into two thread sub-groups (thread sub-group B1 and thread sub-group B2), according to some embodiments. As shown in FIG. 5, in some embodiments worker threads 230 of the backend processing system 200 are divided into two thread groups, referred to herein as thread group A and thread group B. Although FIG. 5 shows an example in which there are eight worker threads 230, that are evenly split into two thread groups each of which has four worker threads, it should be understood that there might be hundreds or thousands of threads in each of the thread groups. Further, different proportions of threads might be included in each of the thread groups. For example, if there are 400 worker threads that are dedicated to processing RRM workload IO operations and RWM workload IO operations, in some embodiments thread group A might have 250 threads and thread group B might have 150 threads. Accordingly, the particular manner in which the set of dedicated threads are allocated to thread group A and thread group B might vary depending on the implementation.

As shown in FIG. 5, in some embodiments the worker threads of thread group A are used to process both RRM workload IO operations and RWM workload IO operations. In some embodiments the threads of thread group B are divided into two thread sub-groups. A first thread sub-group is referred to herein as thread sub-group B1, and includes a set of worker threads that are used to process both RRM workload IO operations and RWM workload IO operations. The second thread sub-group of worker threads of thread group B, referred to herein as thread sub-group B2, includes a set of worker threads that are used to process only RRM workload IO operations. As discussed in greater detail herein, the number of worker threads assigned from thread group B to thread sub-group B1 dynamically varies, based on the duty cycle of the threads of thread group A. Since the number of threads of thread group B is fixed, increasing the number of threads assigned to thread sub-group B1 will decrease the number of threads assigned to thread sub-group B2, and similarly decreasing the number of threads assigned to thread sub-group B1 will increase the number of threads assigned to thread sub-group B2.

Figure 6:
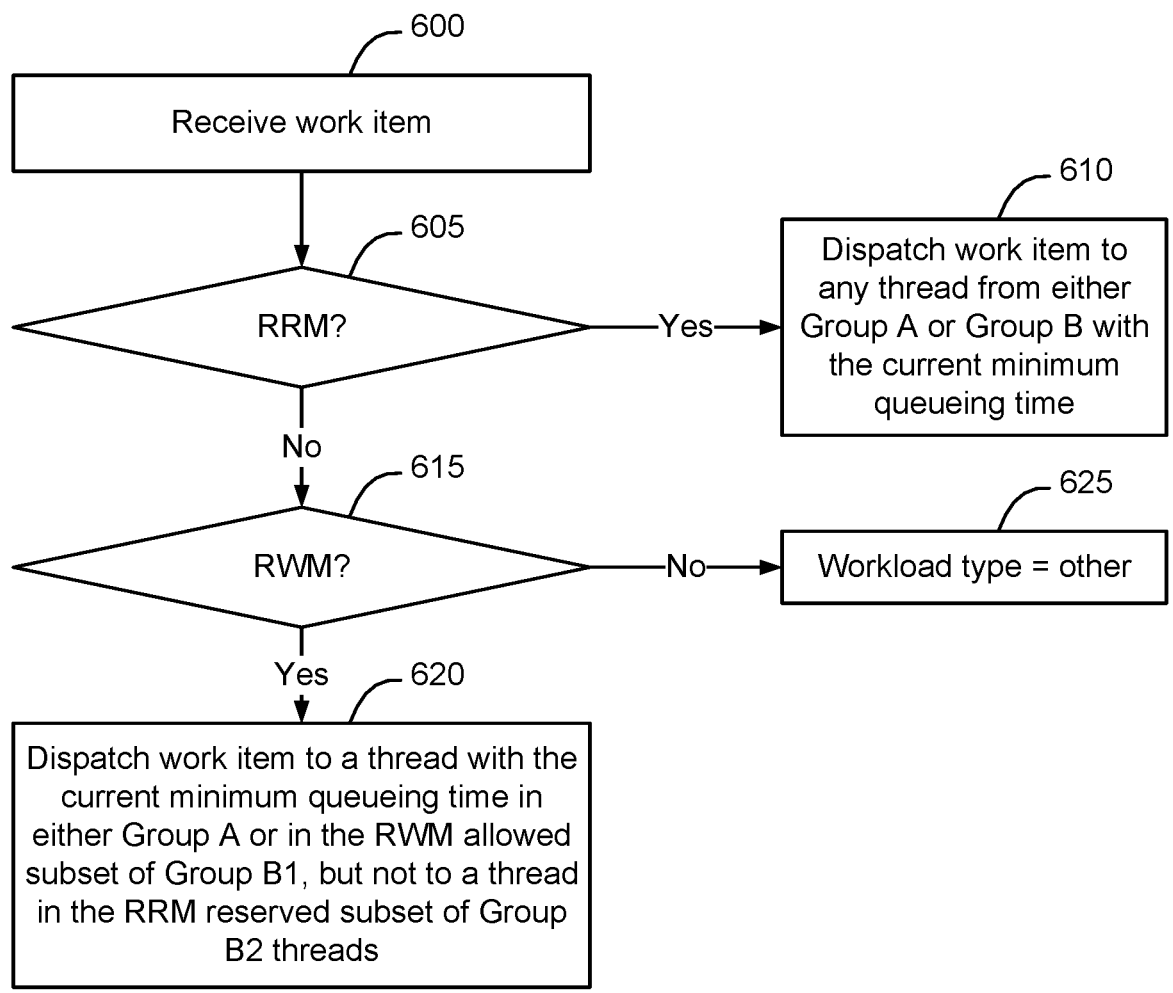
FIG. 6 is flow chart of a process of assigning workload items to worker threads of the thread groups of FIG. 5, according to some embodiments.

FIG. 6 is flow chart of a process of assigning workload items to worker threads of the thread groups of FIG. 5, according to some embodiments. As shown in FIG. 6, when an IO operation is received by the backend processing system 200 (block 600) the backend processing system 200 will determine if the IO operation has a workload type of RRM (block 605) or a workload type of RWM (block 615). Some workloads are not workload type RRM or workload type RWM (a determination of NO at block 605 and a determination of NO at block 615). IO operations with a workload type=other (block 625) may be handled by the backend processing system 200 differently, for example using a thread that does not belong to thread group A or thread group B, depending on the implementation.

If the new IO operation is workload type=RRM (a determination of YES at block 605), the thread allocation system 230 dispatches the work item to a workload queue for any thread from either thread group A or thread group B with the current minimum queueing time 415 (block 610). If the new IO operation is workload type=RWM (a determination of YES at block 615), the thread allocation system 235 dispatches the work item to a workload queue for any thread from either thread group A or thread sub-group B1 with the current minimum queueing time 415 (block 610). Note that the thread allocation system 235 does not dispatch RWM work items to any workload queue for any thread in thread sub-group B2, to thereby reserve the threads of thread sub-group B2 for RRM processing. This enables RRM IO operations to be provided with dedicated processing resources in the storage system to thereby reduce average latency of the RRM IO operations.

Figure 7:
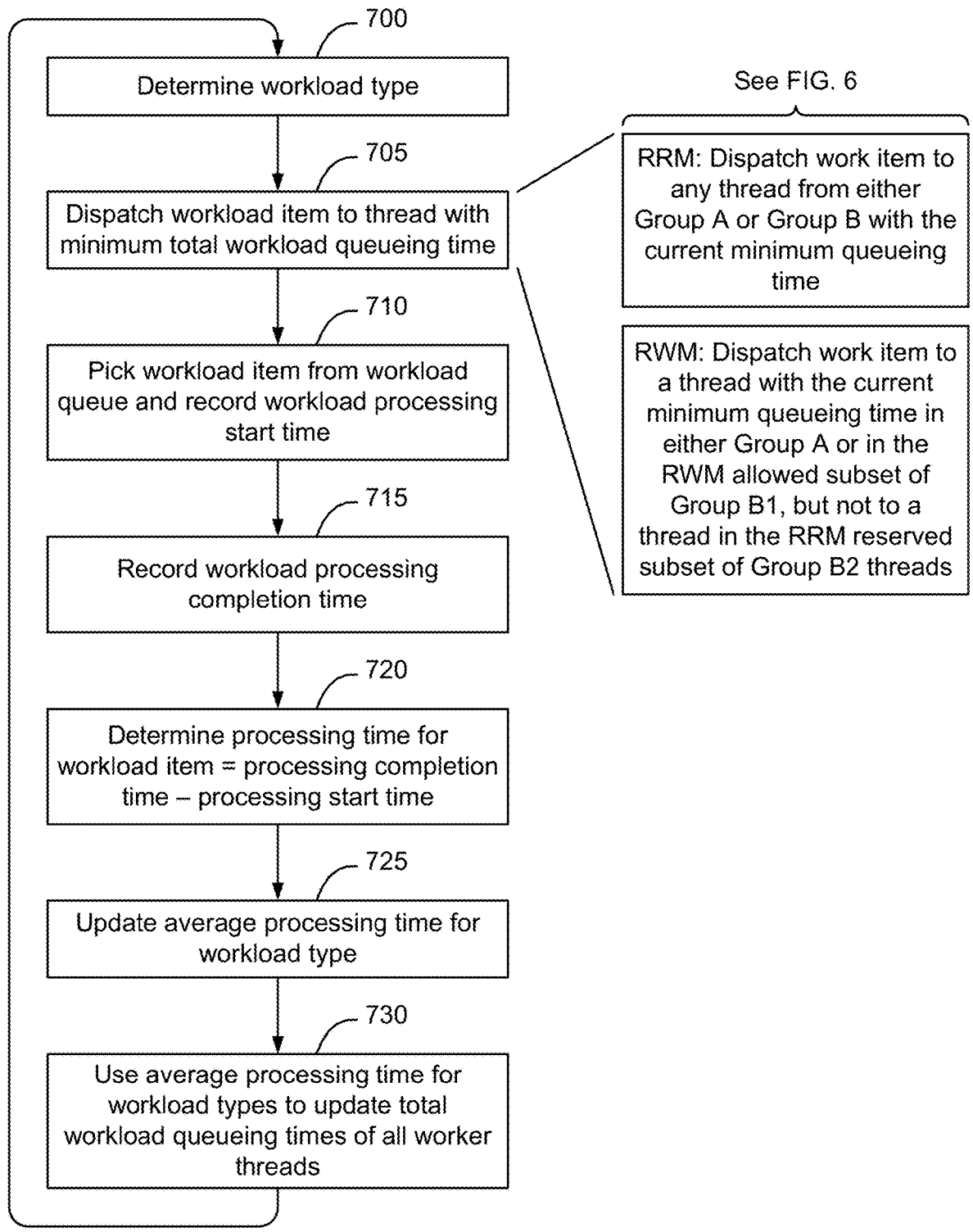
FIG. 7 is flow chart of a process of determining workload processing times of workload items according to workload type, according to some embodiments.

FIG. 7 is flow chart of a process of determining workload processing times of workload items according to workload type, according to some embodiments. As shown in FIG. 7, in some embodiments when an IO operation is received, the workload scheduler 210 determines the workload type (block 710) and dispatches the work item to a workload queue for a thread with the minimum current total workload queueing time (block 705). As discussed above in connection with FIG. 6, in some embodiments if the workload type is RRM, the new IO operation is sent to any thread in thread group A or thread group B that has a current minimum queueing time, whereas if the workload type is RWM, the new IO operation is sent to any thread in thread group A or thread sub-group B1 that has a current minimum queueing time.

When the new IO operation is picked from the workload queue 220 for processing by a worker thread, the processing start time 310 is recorded in the workload processing time data structure 245 (block 710). When the worker thread 230 completes processing of the IO operation, the processing completion time is recorded in the workload processing time data structure 245 (block 715). The thread monitor 240 determines the processing time for the workload item (block 720) by comparing the processing completion time and the processing start time, and uses the processing time to update the current average processing time for the workload type (block 725). The current average processing time is then used to update all of the queueing times 415 for each of the worker threads, to enable the current values of the queueing times 415 to be used for worker thread selection in connection with subsequent IO operations (block 730).

Figure 8:
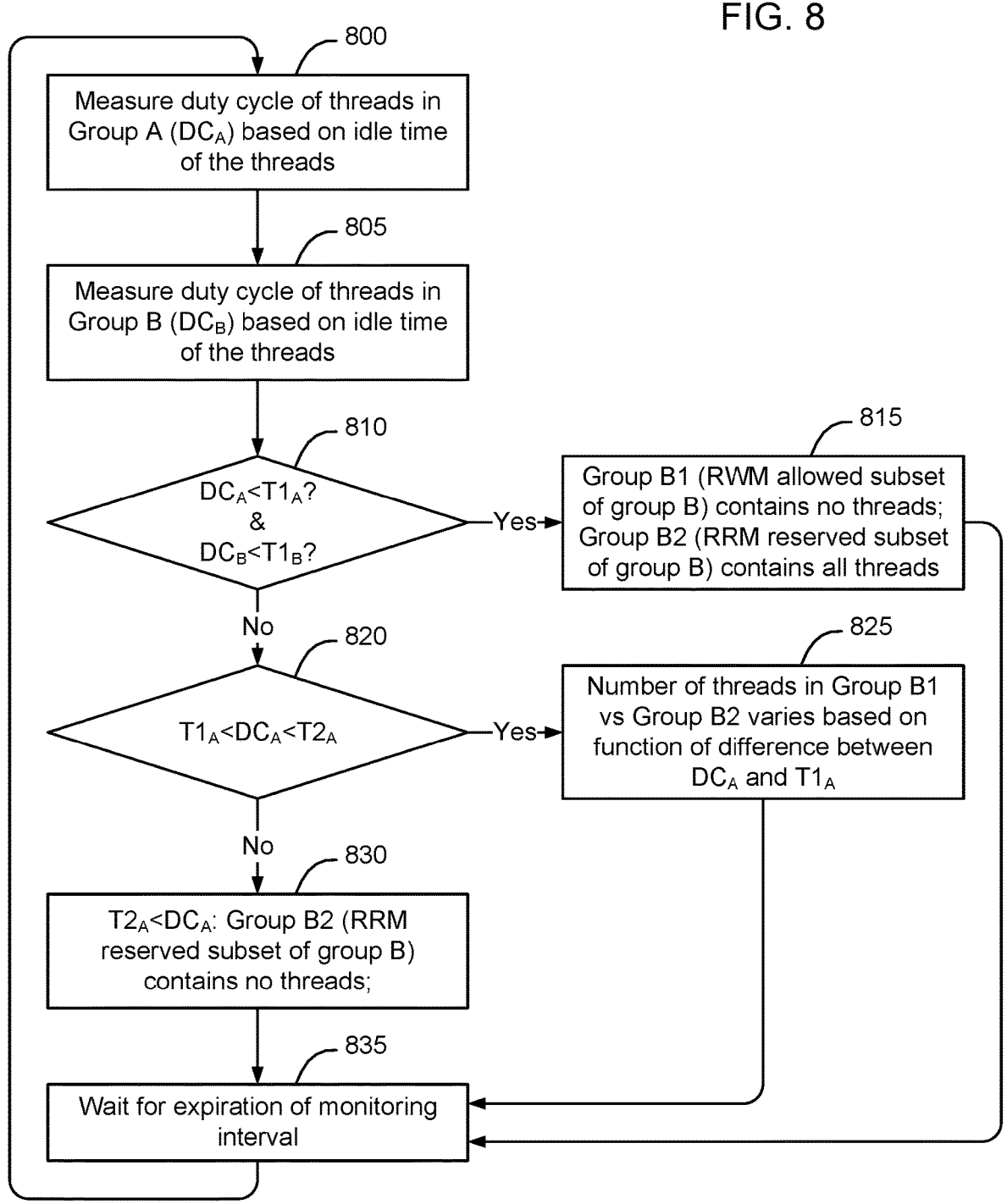
FIG. 8 is flow chart of a process of dynamically adjusting the number of worker threads allocated to each of the two thread sub-groups (thread sub-group B1 and thread sub-group B2) from thread group B, according to some embodiments.

FIG. 8 is flow chart of a process of dynamically adjusting the number of worker threads allocated to each of the two thread sub-groups (thread sub-group B1 and thread sub-group B2) from thread group B, according to some embodiments. In some embodiments, the process shown in FIG. 8 occurs periodically, for example at the end of each monitoring interval. An example monitoring interval might be, for example two seconds, although it should be understood that other monitoring intervals may be used depending on the implementation.

As shown in FIG. 8, in some embodiments the workload scheduler measures the duty cycle of threads in thread group A ($DC_A$) based on the proportion of idle time of the threads in thread group A (block 800). In some embodiments, the duty cycle of a worker thread is calculated as a proportion of time during which the worker thread is being used to process IO operations during a given time period. For example, if a worker thread is active processing IO operations for 1.5 seconds out of every 2 second monitoring interval, the duty cycle for that particular worker thread would be 75%: (1.5/2=0.75×100=75%). The workload scheduler also measures the duty cycle of the threads in thread group B ($DC_B$) based on the proportion of idle time of the threads in thread group B (block 805).

The workload scheduler 210 then compares the duty cycle of threads of thread group A ($DC_A$) with a first thread group A duty cycle threshold $T1_A$, and compares the duty cycle of threads of thread group B ($DC_B$) with a first thread group B duty cycle threshold $T1_B$. At low overall system IOPS, which is reflected by a smaller duty cycle value for both thread groups (a determination of YES at block 810), the subset of thread group B (thread sub-group B1) that is used to process RWM type IO operations is allocated zero threads (block 815). Accordingly, when the condition in block 810 is met (a determination of YES at block 810) thread sub-group B1 will contain zero threads for the upcoming monitoring interval and thread sub-group B2 will contain all the threads of thread group B for the upcoming monitoring interval. This means that no threads from thread group B are used to process RWM type IO operations during the upcoming monitoring interval and all of the threads from thread group B are reserved for RRM type IO operations during the upcoming monitoring interval. This enables the storage system to provide overall low latency for RRM type IO operations by spreading the RRM type IO operations across a larger number of threads. Also, by reserving a set of threads that is dedicated to processing RRM type IO operations, it is possible to reduce the number of instances where a RRM type IO operation is placed in a workload queue behind one or more RWM type IO operations, which tend to have higher latency than RRM type IO operations. It should be noted that RRM type IO operations can still be dispatched to workload queues for threads of thread group A, for example if a thread in thread group A has the lowest current minimum queueing time.

As the overall system IOPS increases, which is reflected by an increasing duty cycle value for thread group A, the number of worker threads allocated to thread sub-group B1 increases, to thus allow RWM workload to be distributed across an increased number of worker threads. In some embodiments, the duty cycle of the threads of thread group A ($DC_A$) is compared with the first thread group A duty cycle threshold $T1_A$, and is also compared with a second thread group A duty cycle threshold ($T2_A$) (block 820). If the duty cycle of the threads of thread group A ($DC_A$) is higher than the first thread group A duty cycle threshold $T1_A$, and lower than the second thread group A duty cycle threshold $T2_A$ ($T1_A<DC_A<T2_A$) (a determination of YES at block 820) the number of threads assigned to in thread sub-group B1 vs thread sub-group B2 varies based on a function (block 825). The function may be a linear function (see e.g., FIG. 9), may be a step function (see e.g., FIG. 10), may be a non-linear function (see e.g., FIG. 11), or some other function. In some embodiments the number of threads assigned to thread sub-group B1 is based on a difference between the duty cycle of the threads of thread group A ($DC_A$) and the first thread group A duty cycle threshold $T1_A$. Equivalently, the number of threads assigned to thread sub-group B1 may be based on a difference between the duty cycle of the threads of thread group A ($DC_A$) and the second thread group A duty cycle threshold $T2_A$ or some other number. Other ways of determining the number of threads of the thread sub-group B1 may be used as well. Once the number of threads of thread sub-group B1 has been determined in block 825, the identified number of threads of thread sub-group B1 are used to process RWM IO operations during the upcoming monitoring interval, and the remaining threads of thread group B (sub-group B2) are reserved to be used to process for RRM type IO operations during the upcoming monitoring interval.

When the duty cycle of thread group A reaches a high value, the subset of threads of thread group B that are used to process RWM IO operations (thread sub-group B1) is increased to incorporate all threads of thread group B. For example, in FIG. 8, if the duty cycle of the threads of thread group A ($DC_A$) is higher than the second thread group A duty cycle threshold $T2_A$, (a determination of NO at block 820), in some embodiments thread sub-group B1 is increased to include all threads of thread group B, and thread sub-group B2 has no threads (block 830). Accordingly, RWM workload will be distributed across all threads of thread group A and thread group B during the upcoming monitoring interval. The process then waits for expiration of the subsequent monitoring interval (block 835), at which time the process returns to re-calculate the dynamic thread allocation for a subsequent monitoring interval.

Figure 9:
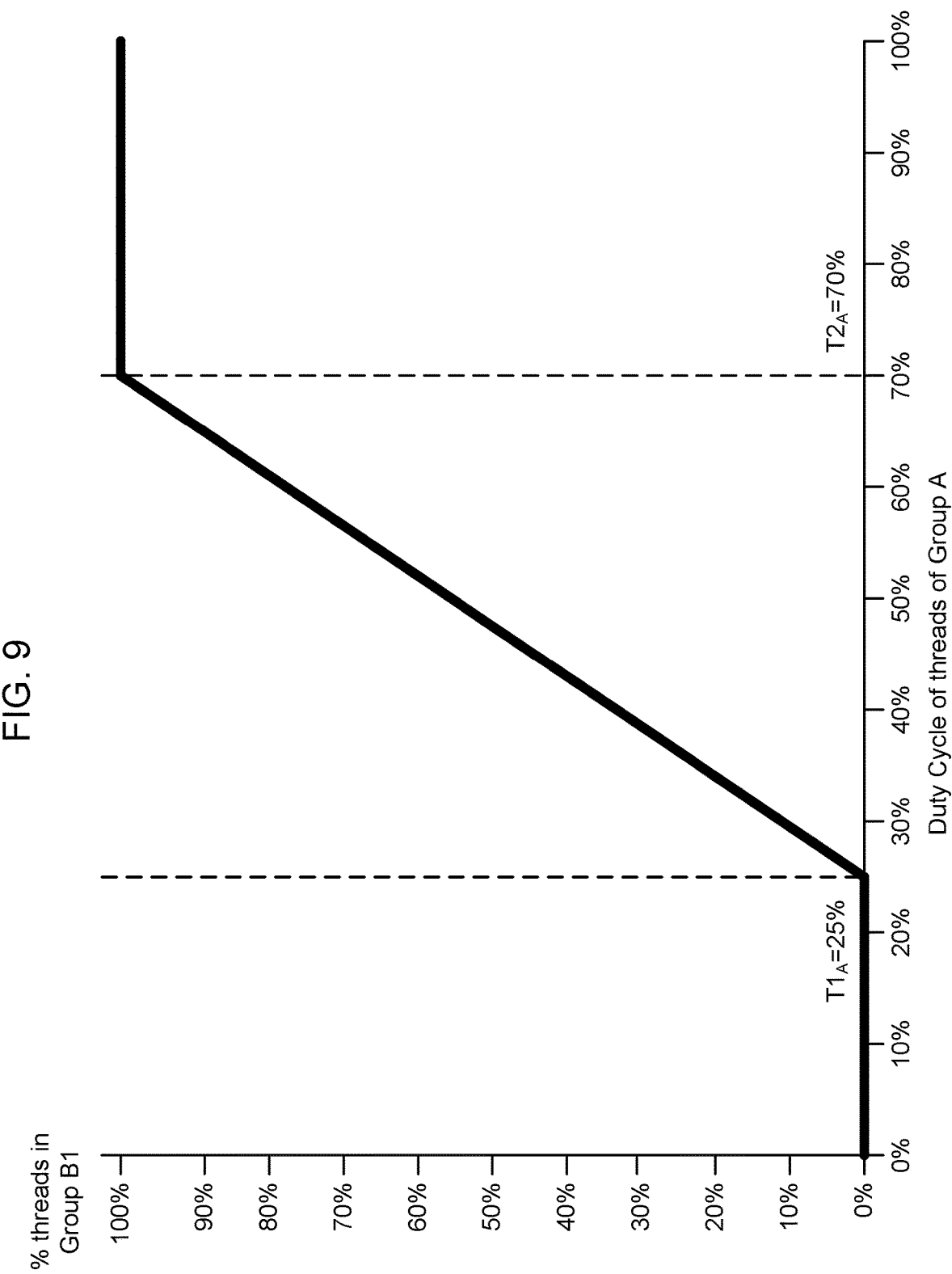
FIGS. 9-11 are graphs showing adjustment of the percentage number of threads allocated to thread sub-group B1 according to a duty cycle of the worker threads of thread group A, using different allocation functions, according to some embodiments.
Figure 10:
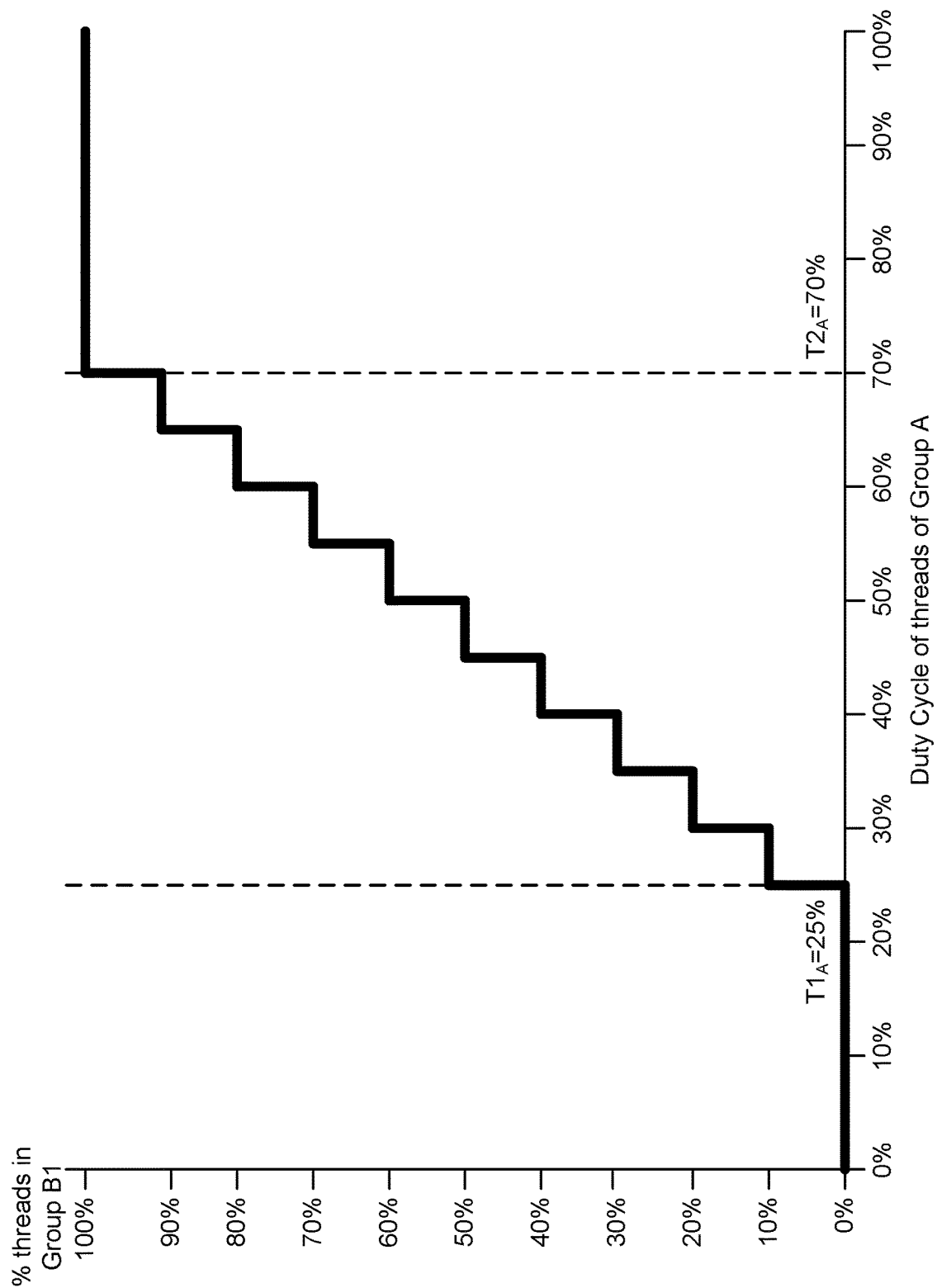
Figure 11:
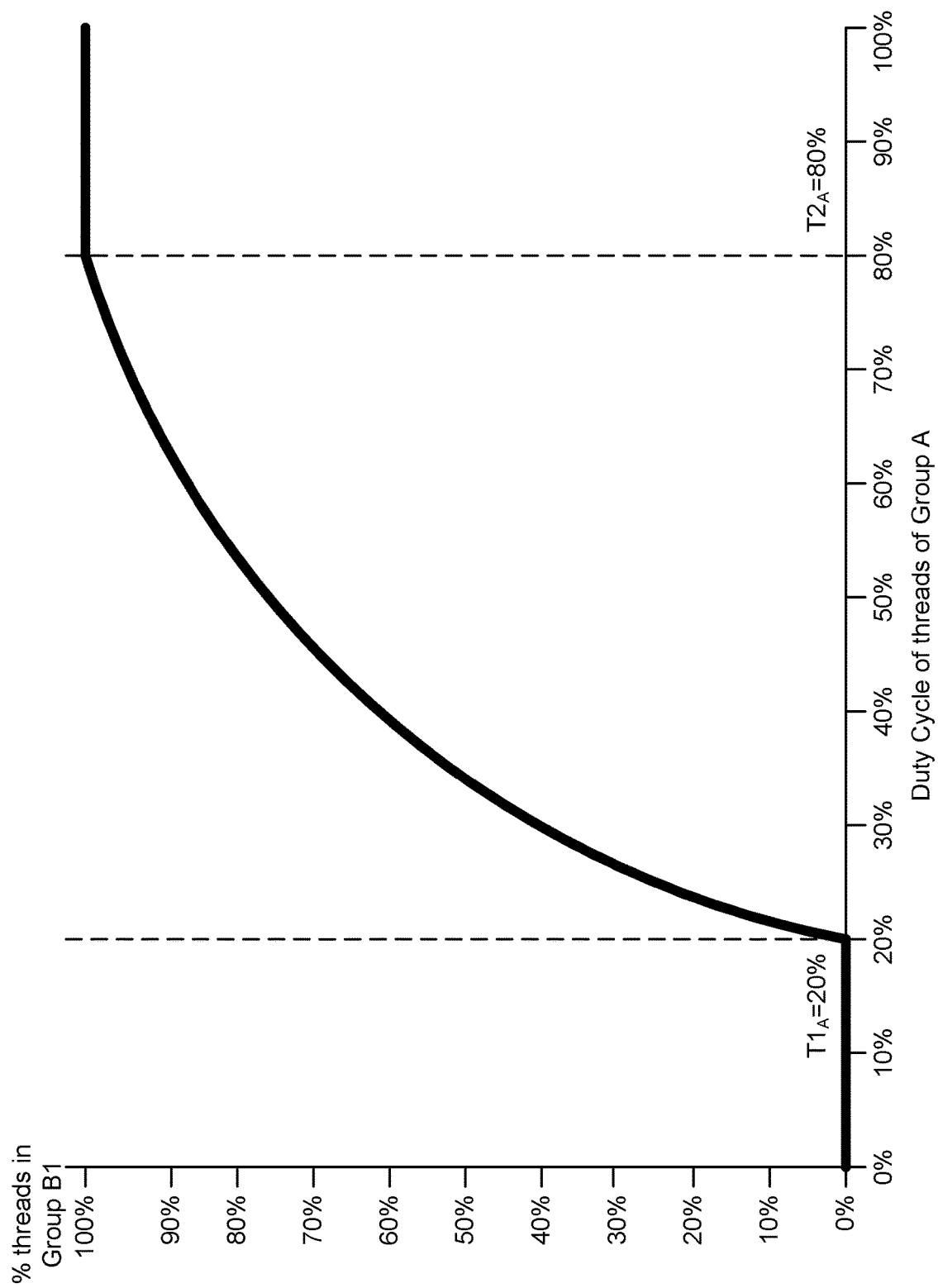

FIGS. 9-11 are graphs showing adjustment of the percentage number of threads allocated to thread sub-group B1 according to a duty cycle of the worker threads of thread group A, using different allocation functions, according to some embodiments. As shown in FIGS. 9-11, there are multiple functions that may be used to dynamically allocate worker threads between thread sub-group B1 and thread sub-group B2, depending on the implementation.

In FIG. 9 for example, when the duty cycle of the threads of thread group A ($DC_A$) is higher than the first thread group A duty cycle threshold $T1_A$, and lower than the second thread group A duty cycle threshold $T2_A$ ($T1_A<DC_A<T2_A$) (a determination of YES at block 820), a linear function is used to determine the number (percentage) of threads assigned to thread sub-group B1. In the illustrated example, the first thread group A duty cycle threshold is set at $T1_A$=25% and the second thread group A duty cycle threshold is set at $T2_A$=70%. The function causes the percentage of threads of thread group B that are assigned to thread sub-group B1 to vary linearly from 0% to 100% as the duty cycle of the threads of thread group A varies between these two thresholds. Below the first thread group A duty cycle threshold $T1_A$, 0% of the threads of thread group B are assigned to thread sub-group B1; above the second thread group A duty cycle threshold $T2_A$, 100% of the threads of thread group B are assigned to thread sub-group B1.

In FIG. 10, instead of using a linear function, a step-wise function is shown as being used to dynamically allocate threads of thread group B to thread sub-group B1. In the example shown in FIG. 10 the same thresholds are used as in FIG. 9, namely, the first thread group A duty cycle threshold $T1_A$=25% and the second thread group A duty cycle threshold is set at $T2_A$=70%.

Likewise, in FIG. 11, instead of using a linear function, a non-linear function is shown as being used to dynamically allocate threads of thread group B to thread sub-group B1. Also, FIG. 11 illustrates an example in which different thresholds are used, namely, the first thread group A duty cycle threshold $T1_A$=20% and the second thread group A duty cycle threshold is set at $T2_A$=80%.

By adjusting the size of the thread groups (thread group A and thread group B), adjusting the thread group A duty cycle thresholds $T1_A$, $T2_A$, and adjusting the function used to dynamically allocate threads of thread group B to thread sub-group B1 (and hence also change the allocation of threads to thread sub-group B2), it is possible to tune application of the dynamic thread allocation process to a particular storage system. Further, by automatically dynamically changing the number of threads used to process different types of IO workloads, it is possible to automatically optimize backend workload processing in a storage system.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for optimizing backend workload processing in a storage system, the computer program including a set of instructions which, when executed by a computer, cause the computer to perform a method comprising the steps of:
   allocating a dedicated set of threads to be individually dispatched and collectively used to process Random Read Miss (RRM) Input/Output (IO) operations and Random Write Miss (RWM) IO operations;
   maintaining a calculated queueing time for each individual thread of the dedicated set of threads;
   dividing the dedicated set of threads into two thread groups to create thread group A and thread group B, such that thread group A and thread group B each comprise a set of two or more individual threads of the dedicated set of threads;
   subdividing the set of two or more threads of thread group B into two thread sub-groups to create thread sub-group B1 and thread sub-group B2;
   individually allocating RRM IO operations to respective threads of thread group A or thread group B;
   individually allocating RWM IO operations to respective threads of thread group A or thread sub-group B1, while not individually allocating any RWM IO operations to any respective thread of thread sub-group B2;
   maintaining a respective workload queue for each thread, and wherein individually allocating RRM IO operations and RWM IO operations comprises individually dispatching the RRM IO operations and RWM IO operations to selected workload queues; and
   dynamically changing a number of individual threads of thread sub-group B1 relative to a number of individual threads of thread sub-group B2 based on a duty cycle of threads of thread group A, wherein the duty cycle of the threads of thread group A is calculated as a proportion of time during which the threads of thread group A are being used to process IO operations during a given time period.

2. The non-transitory tangible computer readable storage medium of claim 1, wherein the calculated queueing time for each thread is based on a number of RRM IO operations in the respective workload queue times a current average RRM IO operation processing time, plus a number of RWM IO operations in the respective workload queue times a current average RWM IO operation processing time.

3. The non-transitory tangible computer readable storage medium of claim 2, wherein each RRM IO operation is allocated to a respective thread of thread group A or thread group B having a minimum calculated queueing time at the time of allocation; and
wherein each RWM IO operation is allocated to a respective thread of thread group A and thread of thread sub-group B1 having a minimum calculated queueing time at the time of allocation.

4. The non-transitory tangible computer readable storage medium of claim 2, wherein the current average RRM IO operation processing time is an average amount of time required to process a recent set of RRM IO operations after picking the RRM IO operations from the workload queues.

5. The non-transitory tangible computer readable storage medium of claim 1, wherein dynamically changing the number of individual threads of thread sub-group B1 relative to the number of individual threads of thread sub-group B2 based on the duty cycle of threads of thread group A comprises:
comparing the duty cycle of the threads of thread group A with a first thread group A duty cycle threshold; and
upon determining that the duty cycle of thread group A is lower than the first thread group A duty cycle threshold, allocating zero threads to thread sub-group B1.

6. The non-transitory tangible computer readable storage medium of claim 1, wherein dynamically changing the number of individual threads of thread sub-group B1 relative to the number of individual threads of thread sub-group B2 based on the duty cycle of threads of thread group A comprises:
comparing the duty cycle of the threads of thread group A with a first thread group A duty cycle threshold;
comparing the duty cycle of the threads of thread group A with a second thread group A duty cycle threshold, the second thread group A duty cycle threshold being higher than the first thread group A duty cycle threshold; and
upon determining that the duty cycle of thread group A is higher than the first thread group A duty cycle threshold and lower than the second thread group A duty cycle threshold, allocating a number of threads to sub-group B1 based on an allocation function.

7. The non-transitory tangible computer readable storage medium of claim 6, wherein the allocation function is based on a difference between the duty cycle of thread group A and the first thread group A duty cycle threshold or a difference between the duty cycle of thread group A and the second thread group A duty cycle threshold.

8. The non-transitory tangible computer readable storage medium of claim 7, wherein the allocation function is a linear function or a non-linear function.

9. The non-transitory tangible computer readable storage medium of claim 1, wherein dynamically changing a number of threads of thread sub-group B1 based on a duty cycle of threads of thread group A comprises:
comparing the duty cycle of the threads of thread group A with a first thread group A duty cycle threshold; and
comparing the duty cycle of the threads of thread group A with a second thread group A duty cycle threshold, the second thread group A duty cycle threshold being higher than the first thread group A duty cycle threshold; and
upon determining that the duty cycle of thread group A is higher than the second thread group A duty cycle threshold, allocating all threads of thread group B to thread sub-group B1.

10. A method of optimizing backend workload processing in a storage system, comprising:
allocating a dedicated set of threads to be individually dispatched and collectively used to process Random Read Miss (RRM) Input/Output (IO) operations and Random Write Miss (RWM) IO operations;
maintaining a calculated queueing time for each individual thread of the dedicated set of threads;
dividing the dedicated set of threads into two thread groups to create thread group A and thread group B, such that thread group A and thread group B each comprise a set of two or more individual threads of the dedicated set of threads;
subdividing the set of two or more threads of thread group B into two thread sub-groups to create thread sub-group B1 and thread sub-group B2;
individually allocating RRM IO operations to any thread of thread group A or thread group B;
individually allocating RWM IO operations to respective threads of thread group A or thread sub-group B1, while not individually allocating any RWM IO operations to any respective thread of thread sub-group B2;
maintaining a respective workload queue for each thread, and wherein individually allocating RRM IO operations and RWM IO operations comprises individually dispatching the RRM IO operations and RWM IO operations to selected workload queues; and
dynamically changing a number of individual threads of thread sub-group B1 relative to a number of individual threads of thread sub-group B2 based on a duty cycle of threads of thread group A, wherein the duty cycle of the threads of thread group A is calculated as a proportion of time during which the threads of thread group A are being used to process IO operations during a given time period.

11. The method of claim 10, wherein the calculated queueing time for each thread is based on a number of RRM IO operations in the respective workload queue times a current average RRM IO operation processing time, plus a number of RWM IO operations in the respective workload queue times a current average RWM IO operation processing time.

12. The method of claim 11, wherein each RRM IO operation is allocated to a respective thread of thread group A or thread group B having a minimum calculated queueing time at the time of allocation; and
wherein each RWM IO operation is allocated to a respective thread of thread group A and thread of thread sub-group B1 having a minimum calculated queueing time at the time of allocation.

13. The method of claim 11, wherein the current average RRM IO operation processing time is an average amount of time required to process a recent set of RRM IO operations after picking the RRM IO operations from the workload queues.

14. The method of claim 10, wherein dynamically changing the number of individual threads of thread sub-group B1 relative to the number of individual threads of thread sub-group B2 based on the duty cycle of threads of thread group A comprises:

comparing the duty cycle of the threads of thread group A with a first thread group A duty cycle threshold; and upon determining that the duty cycle of thread group A is lower than the first thread group A duty cycle threshold, allocating zero threads to thread sub-group B1.

15. The method of claim 10, wherein dynamically changing the number of individual threads of thread sub-group B1 relative to the number of individual threads of thread sub-group B2 based on the duty cycle of threads of thread group A comprises:

comparing the duty cycle of the threads of thread group A with a first thread group A duty cycle threshold;

comparing the duty cycle of the threads of thread group A with a second thread group A duty cycle threshold, the second thread group A duty cycle threshold being higher than the first thread group A duty cycle threshold; and upon determining that the duty cycle of thread group A is higher than the first thread group A duty cycle threshold and lower than the second thread group A duty cycle threshold, allocating a number of threads to sub-group B1 based on an allocation function.

16. The method of claim 15, wherein the allocation function is based on a difference between the duty cycle of thread group A and the first thread group A duty cycle threshold or a difference between the duty cycle of thread group A and the second thread group A duty cycle threshold.

17. The method of claim 16, wherein the allocation function is a linear function or a non-linear function.

18. The method of claim 10, wherein dynamically changing a number of threads of thread sub-group B1 based on a duty cycle of threads of thread group A comprises:

comparing the duty cycle of the threads of thread group A with a first thread group A duty cycle threshold; and comparing the duty cycle of the threads of thread group A with a second thread group A duty cycle threshold, the second thread group A duty cycle threshold being higher than the first thread group A duty cycle threshold; and upon determining that the duty cycle of thread group A is higher than the second thread group A duty cycle threshold, allocating all threads of thread group B to thread sub-group B1.

* * * * *